(12) United States Patent
Blais et al.

(10) Patent No.: US 6,561,790 B2
(45) Date of Patent: May 13, 2003

(54) SEALING MEMBER IN AN INJECTION MOLDING MACHINE

(75) Inventors: Paul Blais, South Burlington, VT (US); Edward Jenko, Essex Junction, VT (US)

(73) Assignee: Husky Injection Molding Systems, Ltd., Bolton (CA)

( * ) Notice: Subject to any disclaimer, the term of this patent is extended or adjusted under 35 U.S.C. 154(b) by 132 days.

(21) Appl. No.: 09/911,960

(22) Filed: Jul. 24, 2001

(65) Prior Publication Data

US 2003/0021863 A1 Jan. 30, 2003

(51) Int. Cl.7 .............................................. B29C 45/22
(52) U.S. Cl. ..................................... 425/572; 264/328.8
(58) Field of Search ................................ 425/549, 572, 425/588; 264/328.8, 328.15

(56) References Cited

U.S. PATENT DOCUMENTS

| | | | |
|---|---|---|---|
| 3,533,594 A | 10/1970 | Segmuller | 249/107 |
| 3,812,228 A | 5/1974 | Skoroszewski | 264/54 |
| 3,940,224 A | 2/1976 | Armour | 425/247 |
| 4,219,323 A | 8/1980 | Bright et al. | 425/572 |
| 5,232,710 A | 8/1993 | Miyazawa et al. | 425/130 |
| 5,896,640 A * | 4/1999 | Lazinski et al. | 425/549 |
| 6,062,846 A * | 5/2000 | Kalemba | 425/549 |
| 6,203,305 B1 | 3/2001 | Hofstetter et al. | |

FOREIGN PATENT DOCUMENTS

| | | |
|---|---|---|
| DE | 28 05 863 | 8/1979 |
| EP | 0 480 223 | 4/1992 |
| EP | 0 911 133 | 4/1999 |
| WO | WO 97 47458 | 12/1997 |

OTHER PUBLICATIONS

Kunststoffe Magazine Article "Angussloses Spritzgiessen mit Heisskanalsystemen" (1979) Figure 14 on p. 780 with partial translation provided.
ANTEC 1987 "The Standardization and Modularization of Hot Runner Systems" by Kopinski pp 1175–1182.
Kunststoffe Magazine (1985) "Development and design of Injection Moulds" by Bangert and Leverkusen pp. 542–549 with translation attached.

* cited by examiner

Primary Examiner—Tim Heitbrink

(57) ABSTRACT

An injection molding apparatus providing a supply of flowable material to a mold cavity, the apparatus having a hot runner system comprising a sealing member located between two manifolds that concentrates the sealing pressure adjacent the melt channels.

31 Claims, 4 Drawing Sheets

SEALING MEMBER IN AN INJECTION MOLDING MACHINE

BACKGROUND OF THE INVENTION

1. Field of the Invention

This invention relates to injection molding machines and more particularly relates to a sealing member inserted in an injection molding machine for substantial reduction or elimination of leakage of a molten material.

2. Summary of the Prior Art

Hot runner assemblies are previously known and are used for molds having a plurality of mold cavities for injection molding of articles of relatively large surface dimensions. The advantage of hot runner molds is that the material is maintained in the molten state in the channels during the interval between each injection operation and the following one.

Prior art hot runner molds may be divided into two groups, i.e. hot runner manifolds that are one piece and have all the melt channels formed therein and multi-piece manifolds that are connected together with "bridge" manifolds. In the multi-piece arrangement, a "bridge" manifold connects at least two sub-manifolds. Melt channels in the bridge manifold align with melt channels in the sub-manifolds. Typically, the bridge manifold is connected to a supply of pressurized molten material.

The melt channels in the "bridge" manifold must align with the melt channels in the sub-manifolds when they are at a predetermined elevated temperature. The sub-manifolds typically communicate with at least one injection nozzle for the transfer of the molten material to a mold cavity. Due to thermal expansion during heat up of the various hot runner manifolds, relative motion between the "bridge" manifold and the sub-manifolds will occur. In accordance with the prior art, the flat surface of the sub-manifold will rub across the flat surface of the "bridge" manifold during heat up, and when the desired temperature is reached, the interface between the respective melt channels will align and seal off by virtue of compressive forces that build up during the heat up process. The reliability and repeatability of this seal off has proven to be problematic and leakage of the molten material between the "bridge" manifold and the sub-manifold is a recurrent problem.

Therefore there is a need for an improved hot runner system that increases the reliability and repeatability of the seal between separate manifold melt channels.

SUMMARY OF THE INVENTION

The primary objective of the present invention is to provide a means for reliably sealing the melt channel interface between a bridge manifold and a sub-manifold.

Another object of the present invention is to reduce the compressive forces generated in a hot runner subsystem during heat up thereby allowing the use of fewer fasteners.

Yet another object of the present invention is to reduce or eliminate the occurrence of galling and/or fretting between plates as they move during heat up.

The foregoing objects are achieved by providing a sealing member or compression disk at the interface of the melt channels between the two manifolds. The sealing member preferably has at least one non-flat surface for concentrating the sealing pressure adjacent the melt channels thereby reducing the forces required to create a reliable seal therebetween.

Further objects and advantages of the present invention will appear hereinbelow.

DETAILED DESCRIPTION OF THE PREFERRED EMBODIMENTS

Figure 1:
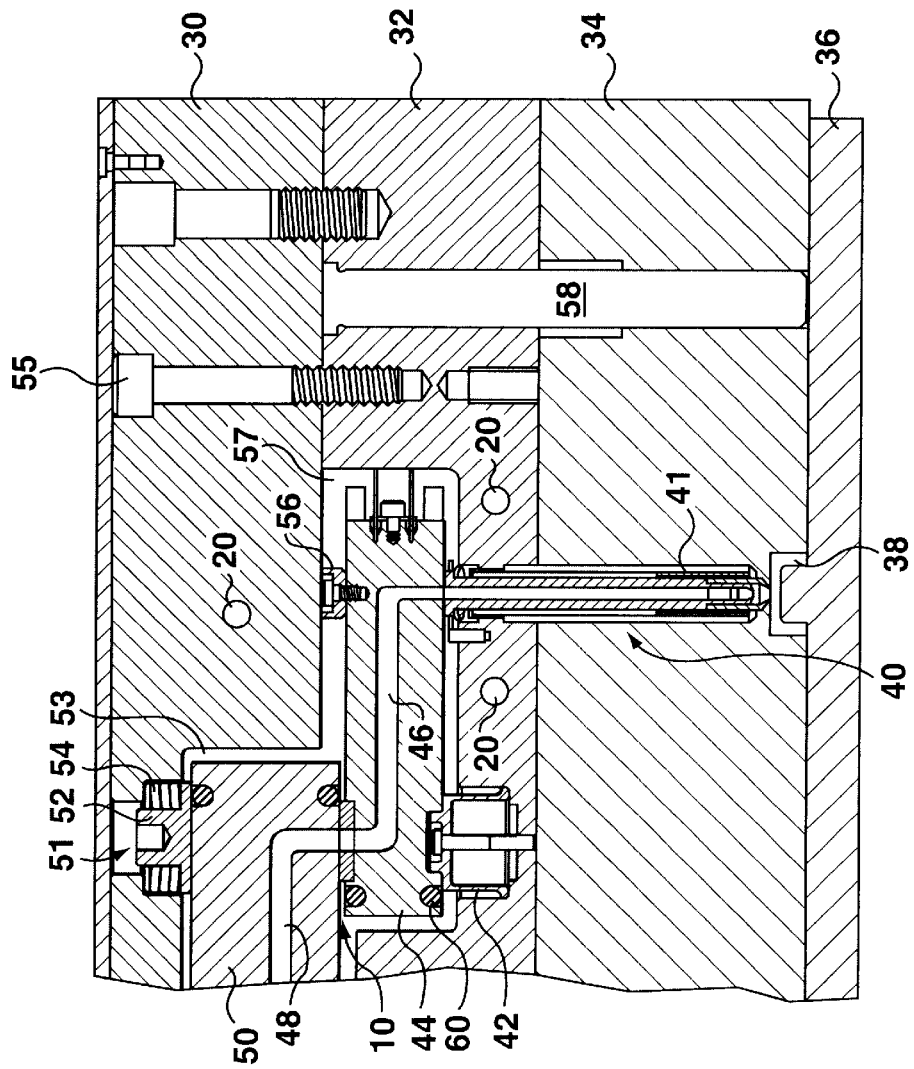
FIG. 1 is a simplified cross-sectional view of a hot runner system in accordance with the present invention.
Figure 2:
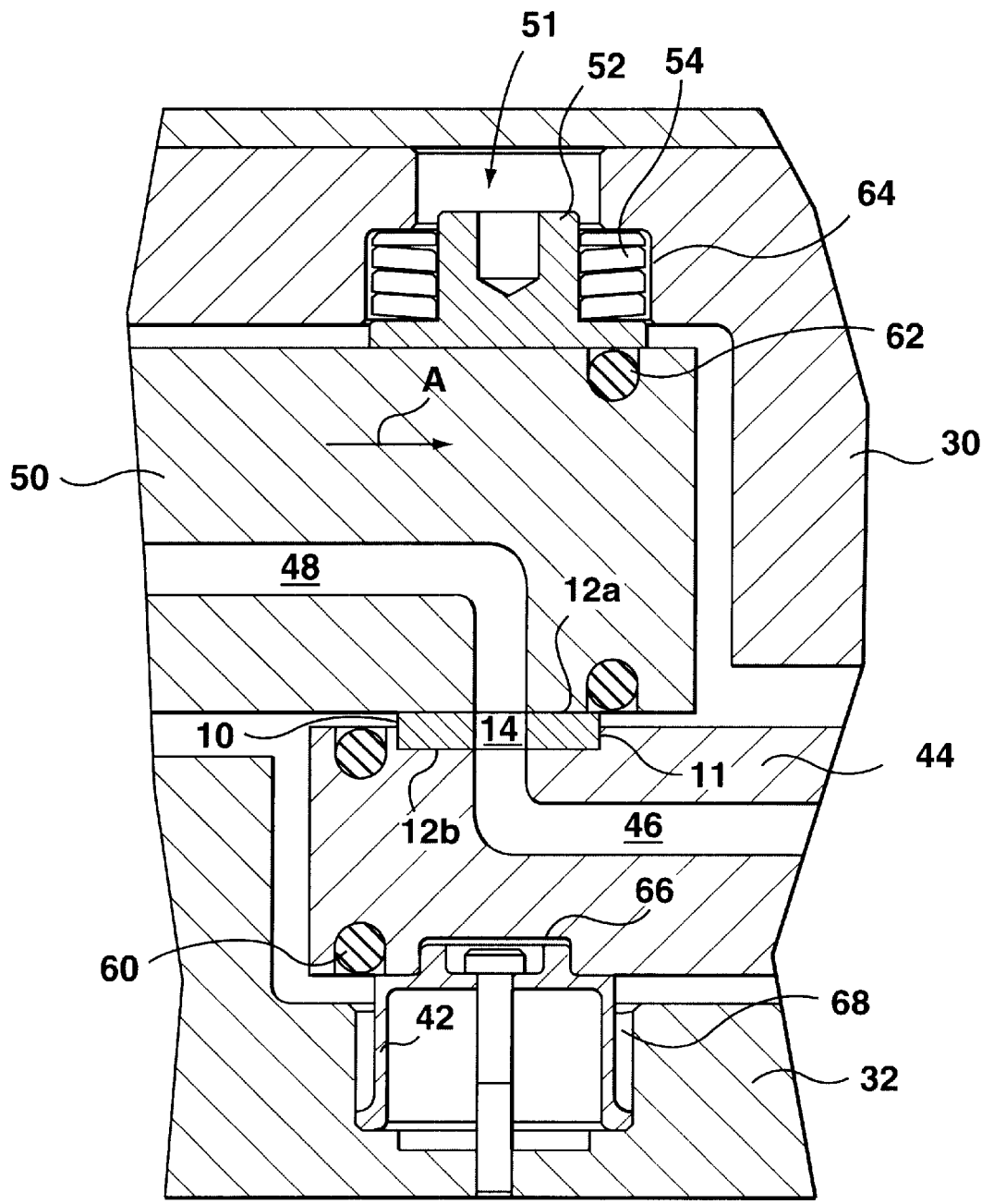
FIG. 2 is an enlarged view of the sealing member in accordance with the present invention.

Referring first to FIGS. 1 and 2, a hot runner subsystem in accordance with the present invention is generally shown. A sealing member 10 having a top surface 12a and a bottom surface 12b is inserted in a recess 11 of a sub-manifold 44. A melt duct 14 in sealing member 10 is aligned with a first melt channel 48 and second melt channel 46 located in a bridge manifold 50 and sub-manifold 44 respectively. Bridge manifold 50 is located in a manifold cavity 53 formed in backing plate 30. A plunger 51, preferably comprised of a plunger bushing 52 and a spring means 54, is located in pocket 64 and maintains a gap between bridge manifold 50 and backing plate 30 to reduce thermal communication therebetween. In the preferred embodiment, the spring means 54 is comprised of a series of stacked Belleville springs to create a resilient spacer to adjust to thermal expansion of the various components. The spring means 54 can also be selected from the group consisting of a compression spring and a resilient material.

A plurality of fasteners 55 rigidly affixes a manifold plate 32 to backing plate 30. Sub-manifold 44 is located in a cavity 57 formed in manifold plate 32. A spacer 56 is located between sub-manifold 44 and backing plate 30 to reduce thermal communication therebetween. In a preferred embodiment, spacer 56 is rigidly affixed to sub-manifold 44 and is allowed to slide along a surface of backing plate 30 thereby allowing thermal expansion. However, spacer 56 could also be rigidly affixed to backing plate 30 and allowed to slide along a surface of sub-manifold 44.

An insulator 42 is located between manifold plate 32 and sub-manifold 44 to maintain a space therebetween and reduce thermal communication. In the preferred embodiment, insulator 42 is inserted into a first hole 66 located in sub-manifold 44 and extends into a second hole 68 located in manifold plate 32 such that it inhibits relative motion between the sub-manifold 44 and manifold plate 32 in the area of sealing member 10.

A nozzle assembly 40 well known in the art is in fluid communication with second melt channel 46 for the communication of fluid to a cavity 38. In the preferred embodiment, the nozzle assembly 40 has a heater 41 as well known in the art to maintain the material therein in a flowable state. The heater 41 may be selected from the group consisting of a resistance heater, induction heater, heat pipe, thick film heater and a thin film heater. In the preferred embodiment, the nozzle assembly 40 is located in manifold plate 32 and extends through a cavity plate 34 to cavity 38. Cavity plate 34 is aligned with manifold plate 32 by at least one alignment pin 58 as well known in the art. A core plate 36 is located in alignment with cavity plate 34 to form cavity 38 which defines the shape of the molded article to be produced.

Operation of the preferred embodiment hot runner subsystem with regard to the present invention will now be described. Before an injection molding operation begins, the various components that comprise the hot runner subsystem are at room temperature. At room temperature, or in its cold condition, first melt channel 48 and melt duct 14 are purposely designed to be misaligned so that when heat is applied by heaters 60 and 62, the components will grow due to thermal expansion and move into an aligned configuration. As bridge manifold 50 is heated by heater 62, it will expand in a direction as shown by arrow A. Plunger 51 will allow bridge manifold 50 to slide and align first melt channel 48 with melt duct 14 in sealing member 10. This requires that the bottom surface of bridge manifold 50 slide along the top surface 12a of sealing member 10. The heater 62 may be selected from the group consisting of a resistance heater, induction heater, heat pipe, thick film heater and a thin film heater.

In the prior art, this sliding would occur on the top surface of sub-manifold 44, requiring the entire surface to be precision ground to reduce galling between the sliding surfaces. In addition, since the prior art required sealing between first melt channel 48 and second melt channel 46 to occur between these two large surfaces, extremely high pressures between the two plates were required to ensure a reliable seal. In accordance with the present invention, the sealing member 10 concentrates the sealing force directly adjacent the melt channels and also allows for reduced pressure between the plates to create a reliable seal. In addition, a reduction in the sliding surface area substantially reduces the chance of galling as the plates grow and slide due to thermal expansion.

Figure 3:
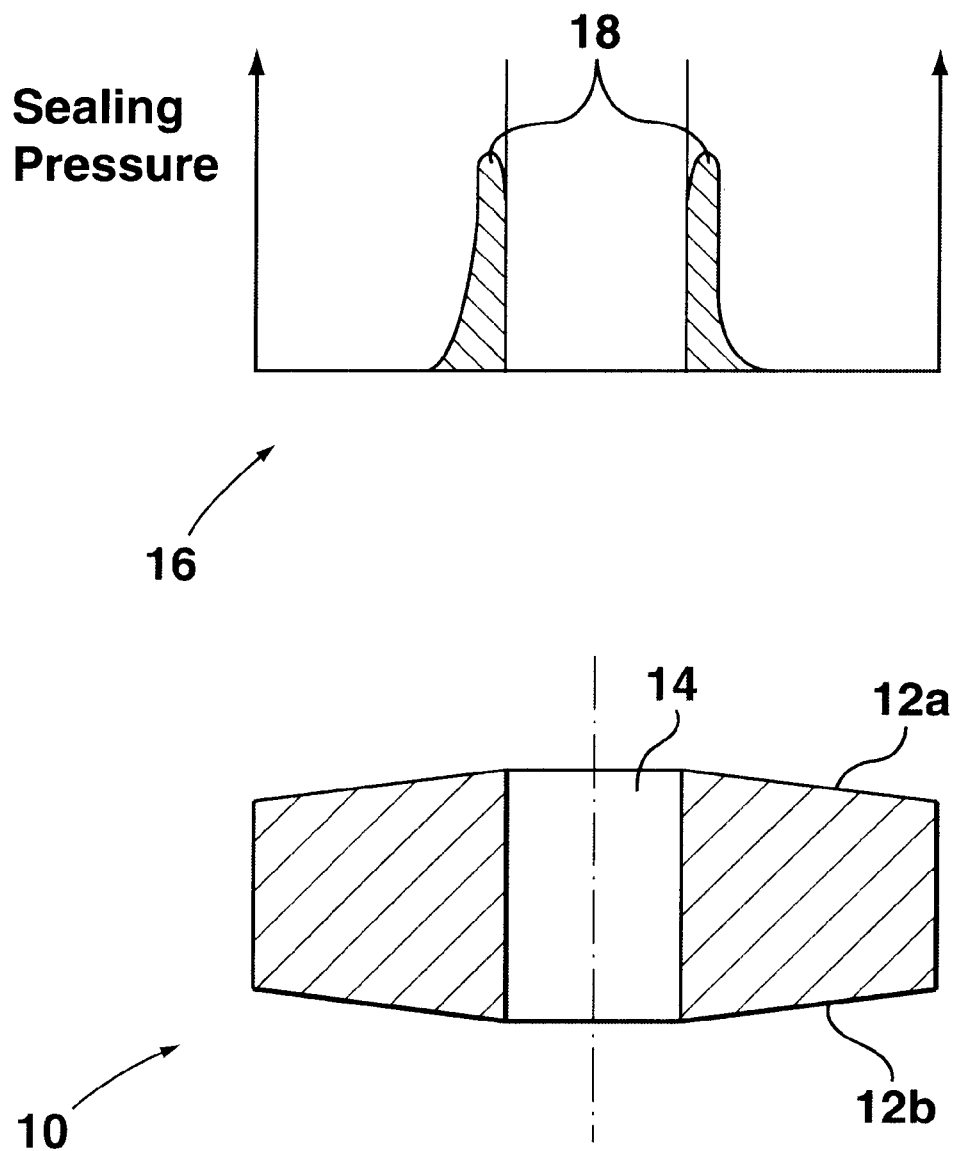
FIG. 3 is a cross-sectional view of the sealing member with a graph showing the sealing pressure distribution along the sealing member.

Referring now to FIG. 3, an enlarged cross-sectional view of the sealing member 10 with a sealing pressure distribution graph 16 is shown. As shown in the figure, top surface 12a and bottom surface 12b are non-flat or conical. This configuration concentrates the sealing pressure 18 along the periphery of the melt duct 14 and creates a highly reliable seal. By concentrating the sealing pressure, the force required to ensure a reliable seal is reduced, and this reduces the chance of galling as the plates move. It also reduces the number of fasteners 55 required to hold the backing plate 30 to the manifold plate 32 and further reduces the amount of bowing by the various plates during an injection cycle.

Figure 4A:
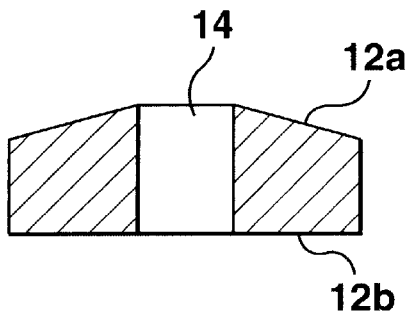
FIG. 4a–4f are cross-sectional views of alternate embodiments of the sealing member in accordance with the present invention.
Figure 4D:
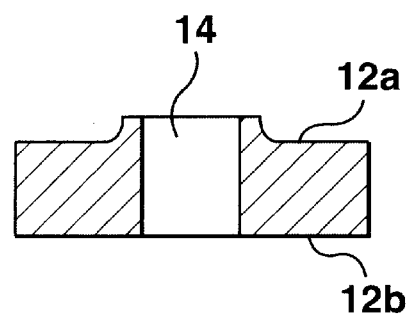
Figure 4B:
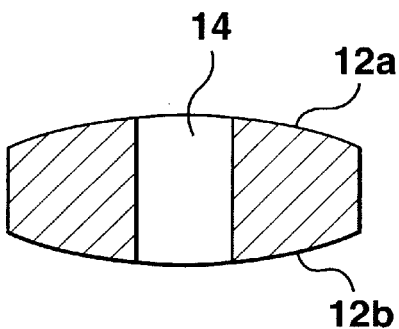
Figure 4E:
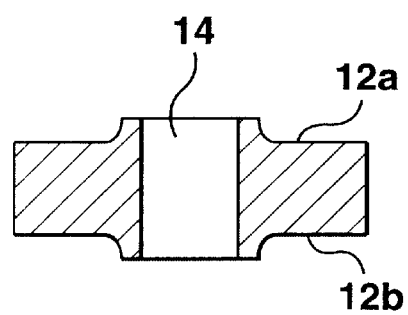
Figure 4C:
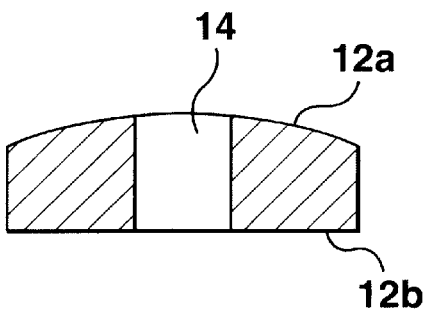
Figure 4F:
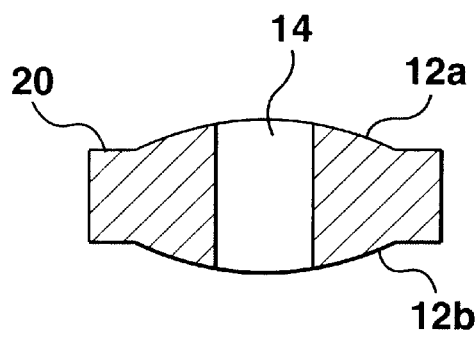

Referring now to FIGS. 4a–4f, an array of alternative embodiments for sealing member 10 is shown. FIG. 4a shows a sealing member where top surface 12a is angled or conical and bottom surface 12b is substantially flat. FIG. 4b shows a spherical or radiused top and bottom surface. FIG. 4c shows a flat bottom with a spherical or radiused top surface. FIG. 4d shows a top surface 12a that has a raised annular area that concentrates the sealing pressure along the melt duct 14 and FIG. 4e also shows this raised annular area on both the bottom and the top surface. FIG. 4f shows another alternative embodiment where the top and bottom surface have a flat portion and then a spherical or radiused portion to concentrate the sealing pressure.

It is to be understood that the invention is not limited to the illustrations described herein, which are deemed to illustrate the best modes of carrying out the invention, and which are susceptible to modification of form, size, arrangement of parts and details of operation. The invention is intended to encompass all such modifications, which are within its spirit and scope as defined by the claims.

What is claimed is:

1. An injection molding apparatus providing a supply of flowable material to a mold cavity, said apparatus having a hot runner system comprising:
   a bridge manifold in fluid communication with said supply of flowable material, said bridge manifold having at least one first melt channel formed therein for the fluid communication of said flowable material,
   at least one sub-manifold located between said bridge manifold and said mold cavity, said sub-manifold having at least one second melt channel formed therein for the fluid communication of said flowable material,
   at least one sealing member located between said sub-manifold and said bridge manifold, said sealing member having a melt duct formed therein such that said melt duct is in fluid communication with said at least one first melt channel and said at least one second melt channel when said flowable material is being communicated to said cavity, said sealing member further comprising a top surface abutting said bridge manifold for the concentration of a sealing pressure adjacent the periphery of said melt duct.

2. The apparatus of claim 1 wherein said bridge manifold is heated.

3. The apparatus of claim 2 wherein said bridge manifold is heated by one selected from the group consisting of a resistance heater, induction heater, heat pipe, thin film heater and a thick film heater.

4. The apparatus of claim 1 wherein said bridge manifold is located in a spaced-apart relationship to a backing plate by at least one plunger assembly.

5. The apparatus of claim 4 wherein said at least one plunger assembly is comprised of a plunger which abuts a surface of said bridge manifold and a spring means for the transmission of a compressive force between said bridge manifold and said backing plate.

6. The apparatus of claim 5 wherein said bridge manifold is allowed to change in dimensions due to thermal growth while maintaining said compressive force between said backing plate and said bridge manifold.

7. The apparatus of claim 5 wherein said spring means is one selected from the group consisting of a Belleville spring, compression spring and a resilient material.

8. The apparatus of claim 5 wherein said at least one plunger assembly is aligned with a respective said at least one sealing member.

9. The apparatus of claim 1 wherein said sub-manifold is heated.

10. The apparatus of claim 9 wherein said sub-manifold is heated by one selected from the group consisting of a resistance heater, induction heater, heat pipe, thin film heater and a thick film heater.

11. The apparatus of claim 1 wherein said sub-manifold is in a spaced-apart relationship to said bridge manifold.

12. The apparatus of claim 11 wherein the space between said bridge manifold and said sub-manifold is determined by said sealing member.

13. The apparatus of claim 1 wherein said sub-manifold is affixed to a manifold plate to inhibit motion of said sealing member.

14. The apparatus of claim 1 further comprising:
   a backing plate having a manifold cavity formed therein for receipt of said bridge manifold,
   a manifold plate rigidly affixed to said backing plate, said manifold plate having a sub-manifold cavity formed therein for the receipt of said sub-manifold, a spacer between said backing plate and said sub-manifold arranged to allow thermal expansion of said sub-manifold while maintaining a gap between said backing plate and said sub-manifold, an insulator located between said manifold plate and said sub-manifold to substantially restrict the movement of said sealing member, a plunger between said backing plate and said bridge manifold allowing relative motion of said bridge manifold and said backing plate and said plunger providing a force between said bridge manifold and said sealing member and further providing a predetermined gap between said backing plate and said bridge manifold.

15. The apparatus in accordance with claim 14 further comprising at least one injection nozzle in fluid communication with a respective said second melt channel and a respective said mold cavity.

16. The apparatus in accordance with claim 15 wherein said at least one nozzle is located in said manifold plate.

17. The apparatus in accordance with claim 16 wherein said at least one nozzle further extends through a cavity plate to said cavity.

18. The apparatus in accordance with claim 17 wherein said cavity plate is held in alignment with said manifold plate by at least one alignment pin.

19. The apparatus in accordance with claim 15 wherein said at least one nozzle is heated.

20. The apparatus in accordance with claim 19 wherein said at least one nozzle is heated by one selected from the group consisting of a resistive heater, induction heater, heat pipe, thick film heater and a thin film heater.

21. The apparatus in accordance with claim 14 wherein said plunger is resilient.

22. The apparatus of claim 14 wherein said plunger further comprises a spring means in communication with a plunger bushing for transmission of a compressive force to said sealing member.

23. The apparatus according to claim 1 wherein said sealing member is affixed in a recess in said sub-manifold.

24. The apparatus according to claim 1 wherein said sealing member is affixed in a recess in said bridge manifold.

25. The apparatus according to claim 1 wherein said sealing member has a non-flat top surface in sealing contact with said bridge manifold and a bottom surface in sealing contact with said sub-manifold.

26. The apparatus according to claim 25 wherein said non-flat top surface is spherical.

27. The apparatus according to claim 25 wherein said non-flat top surface is a concave radius.

28. The apparatus according to claim 25 wherein said non-flat top surface is conical.

29. The apparatus according to claim 25 wherein said non-flat top surface is comprised of a raised portion that protrudes from said sealing member.

30. The apparatus according to claim 29 wherein said raised portion is an annulus.

31. The apparatus according to claim 1 wherein said sealing member has a non-flat top surface in sealing contact with said bridge manifold and a non-flat bottom surface in sealing contact with said sub-manifold.

* * * * *